(12) United States Patent
Singh et al.

(10) Patent No.: US 10,503,697 B1
(45) Date of Patent: Dec. 10, 2019

(54) SMALL FILE STORAGE SYSTEM

(71) Applicant: EMC Corporation, Hopkinton, MA (US)

(72) Inventors: Pranay Singh, San Ramon, CA (US); Hemant Khachane, Sunnyvale, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 668 days.

(21) Appl. No.: 15/199,215

(22) Filed: Jun. 30, 2016

(51) Int. Cl.
*G06F 16/174* (2019.01)
*G06F 16/28* (2019.01)
*G06F 16/22* (2019.01)
*G06F 16/16* (2019.01)

(52) U.S. Cl.
CPC ........ *G06F 16/1752* (2019.01); *G06F 16/164* (2019.01); *G06F 16/2246* (2019.01); *G06F 16/285* (2019.01)

(58) Field of Classification Search
CPC .. G06F 16/1752; G06F 16/285; G06F 16/164; G06F 16/2246; G06F 17/3012; G06F 17/30159; G06F 17/30327; G06F 17/30598
USPC ........................................................ 707/692
See application file for complete search history.

(56) References Cited

U.S. PATENT DOCUMENTS

| | | | | |
|---|---|---|---|---|
| 7,715,324 | B1* | 5/2010 | Harvell | H04L 29/12594 370/252 |
| 9,690,937 | B1* | 6/2017 | Duchin | G06F 21/562 |
| 10,078,643 | B1* | 9/2018 | Lowry | G06F 17/30159 |
| 2012/0089579 | A1* | 4/2012 | Ranade | G06F 16/1744 707/693 |
| 2015/0186407 | A1* | 7/2015 | Xu | G06F 16/1873 707/638 |
| 2015/0280959 | A1* | 10/2015 | Vincent | G06F 16/1774 709/203 |
| 2017/0124325 | A1* | 5/2017 | Alme | G06F 17/30327 |
| 2018/0365261 | A1* | 12/2018 | Volvovski | G06F 17/30156 |

* cited by examiner

*Primary Examiner* — James Trujillo
*Assistant Examiner* — Jessica N Le
(74) *Attorney, Agent, or Firm* — Womble Bond Dickinson (US) LLP

(57) ABSTRACT

A small file storage system reduces the cost of storing and reading segmented data in a deduplication storage system. A data-blocking scheme is used to store small files instead of generating different levels of metadata as is done for larger files in deduplication systems. Among other advantages, the data blocking scheme reduces the cost of reading metadata segments from the content store, reduces the cost of index lookup, CM region read and decompression, and the cost of recalling and restoring small files from cloud storage, all of which contribute to better read performance. Other advantages include faster verification of small files, and improvements in small file data locality on disk with larger segment sizes. By eliminating the need to update metadata segments, embodiments of the small file storage system advantageously increase the efficiency of file updates, especially since updates to smaller files are more random in nature.

13 Claims, 9 Drawing Sheets

VARIABLE BLOCK MAP 300

DATA TREE STORAGE 500 under US 10,503,697 B1

SMALL FILE STORAGE SYSTEM

FIELD OF THE INVENTION

Embodiments of the present invention relate generally to data storage systems. More particularly, embodiments of the invention relate to storing small files in data storage systems using deduplication.

BACKGROUND

In response to unprecedented growth in the amount of data generated in modern computing environments, data storage systems are leveraging object storage paradigms. Object storage paradigms store data in chunks and deduplicate the chunks to minimize or eliminate redundant storage of data.

Using object storage paradigms entails a certain amount of overhead. For example, when storing a file, the file must be broken into the chunks and deduplicated such that the deduplicated chunks can be located and reassembled for subsequent retrieval. Managing object storage requires data structures and processing logic, both of which result in overhead when storing and retrieving files.

When used to store large files, the amount of overhead to implement an object storage paradigm is generally small relative to the large amount of redundant data that can be eliminated. When used to store small files, however, the amount of overhead can be even larger than the data being stored. For this reason, data storage systems that use object storage paradigms to store small files often cost more in storage and processing than is saved.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Small files do not compress well using deduplication since there is less redundancy in content. In a typical system, small files can include such files as transaction log files, emails, metadata files and xml files, all of which are commonly encountered in enterprise and cloud computing environments. Storing a large number of such files inefficiently using deduplication can be expensive.

Figure 2:
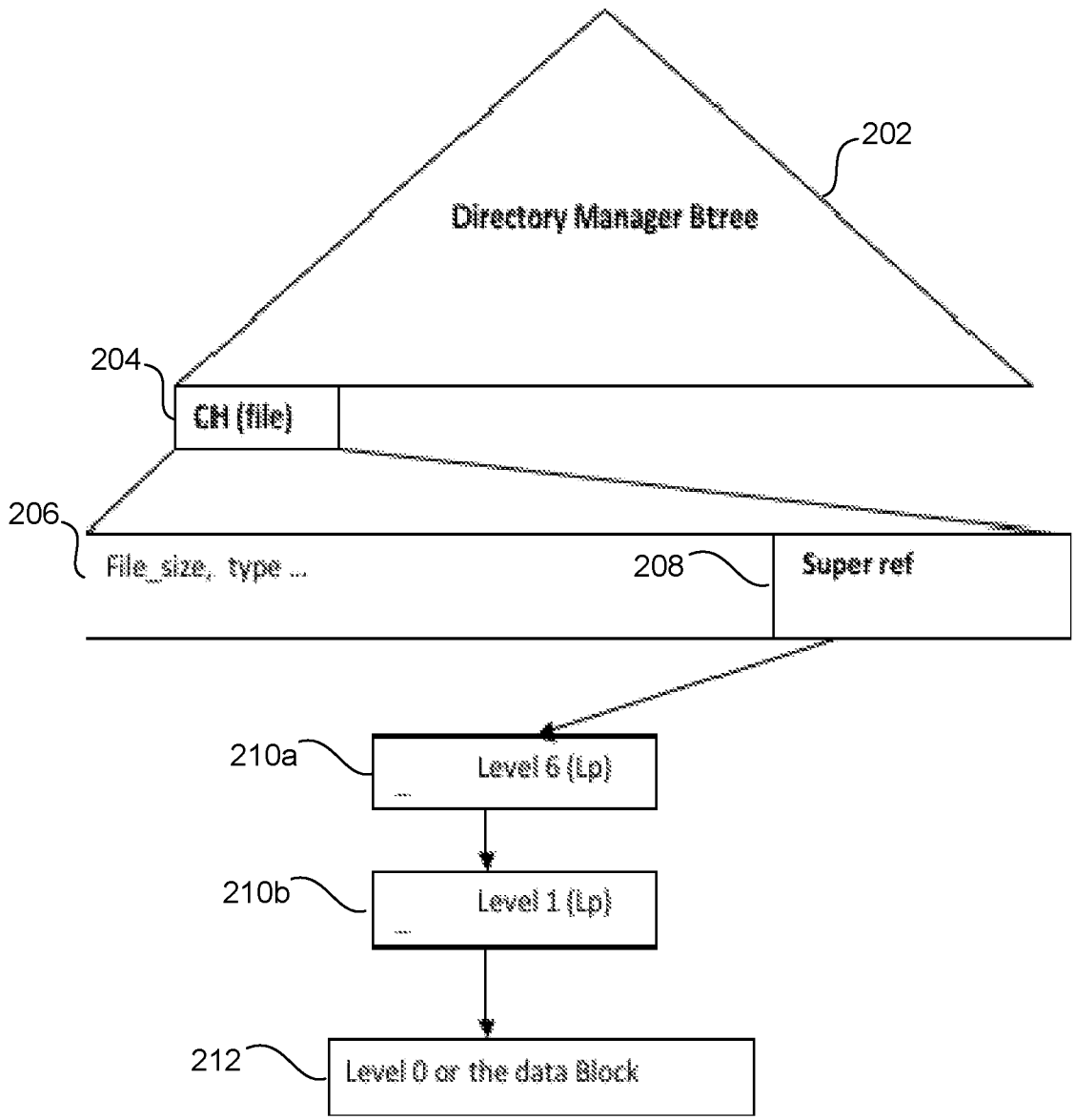
FIG. 2 is a block diagram illustrating a default storage tree for storing files without regard to the size of the files being stored.

The data structures used to store files in deduplication storage systems can create further inefficiencies. For example, with reference to the illustrated example in FIG. 2, in the proprietary deduplication system used in the EMC data storage systems, the default storage tree 200 uses a segment tree layout 206-212. The segment tree layout 206-212 is inefficient for storing small files. The inefficiency is due in part to the cost of reading metadata 210a/210b that is generated for each data block 212 that is stored.

Specifically, each file stored using the default storage tree 200 has a content handle (CH) 204 that points to the segment tree layout 206/208 in which the file size, type and other data are stored along with a super segment reference 208 to all of the other metadata 210a/210b and data objects 212 used to store and retrieve files using deduplication.

In deduplication systems, the data objects are the unique chunks of physical data that make up the content of the file, and are referred to in the default storage tree 200 and segment tree layout 206-212 as the level 0 (L0) segment, or data block segment 212. The metadata describe the layout of the file being stored, and are referred to in the default storage tree 200 and segment tree layout 206-212 as the level p (Lp) segments 210a/210b.

In existing deduplication systems, there is a minimum of three levels of Lp metadata segments 210a/210b for each file regardless of the size of the file. The segmented data is typically stored in containers that can be up to 4.5 Mb large, and the metadata segments Lp 210a/210b are usually stored in a separate container from the data block segments L0 212. Certain metadata segments associated with the file system are also held in a separate container from both the data block segments L0 212 and even other metadata segments Lp 210a/210b.

As a result of the minimum storage requirements, even small files will likely require at least three different containers of 4.5 Mb each to store one file. Storing a large number of small files will generate a large amount of containers for a relatively small amount of data. Although there are some techniques to consolidate the segmented data, the underlying problem remains.

To reduce the inefficiencies in using segmented data structures to store small files for deduplication, a novel small file storage system is herein described to reduce the cost of storing and reading the segmented data. In one embodiment, the small file storage system includes a data blocking scheme that, among other advantages, eliminates the cost of reading metadata segments from the content store, reduces the cost of index lookup, CM region read and decompression, and avoids the cost of recalling and restoring small and very small files that have been migrated to cloud storage, all of which contribute to better read performance.

In addition, in one embodiment, the small file storage system reduces the amount of processing time required to verify small files and improves small file data locality on disk with larger segment sizes. By eliminating the need to update metadata segments, embodiments of the small file storage system advantageously increase the efficiency of file updates, especially since updates to smaller files are more random in nature.

In accordance with one embodiment, a small file storage system in a data storage system using deduplication represents a small file F written to an object store using a data block map that increases the efficiency of both storage and retrieval of the file in the context of deduplication. In one embodiment, the data block map includes any one or more of a variable block map and a fixed block map.

In one embodiment, the decision whether to use a variable or fixed block map depends on the process of anchoring, also referred to as chunking, in which segments or blocks in any de-duplication system is identified. In one embodiment, for small data block mapping, blocks are identified based on a mathematical maxima, such as the largest value in a certain range of block sizes, and that largest value helps to determine where a given block boundary should be. In the context of small data block mapping, the certain range of sizes can be from 8 KB to 64 KB (instead of the typical deduplication range from 4 KB to 12 KB), as this will help to ensure that small files have blocks that are as large as possible. The advantage of having larger blocks is to provide better read performance, since read performance of small files is paramount.

In one embodiment, the small file storage system uses the variable block map to store one or more segments of a small file's data in a segmented tree structure specifying the small file's size and type followed by one or more fingerprints, each fingerprint pointing to and specifying the size of a variable segment containing one of the one or more segments of the small file's data. In one embodiment, the variable block map is used to store small files within a certain size range. For purposes of illustration and by way of example only, the certain size range criteria for storing small files using the variable block map includes small files in which anchoring identifies segments ranging from 8 KB to 64 KB in size.

In one embodiment, the small file storage system uses the fixed block map to store one or more segments of a small file's data in a segmented tree structure specifying the small file's size, type and fixed segment size, followed by one or more fingerprints, each fingerprint pointing to a fixed segment containing one of the one or more segments of the small file's data. In one embodiment, the fixed block map is used to store small files within a certain size range. For purposes of illustration and by way of example only, the certain size range criteria for storing small files using the fixed block map includes small files in which anchoring identifies segments ranging from 32 KB to 64 KB in size.

In one embodiment, the small file storage system stores all of a small file's data in the data tree structure itself, specifying the small file's size, type and segment size, followed by all of the small file's data. In one embodiment, the data tree structure is used to store small files within a certain size range. For purposes of illustration and by way of example only, the certain size range criteria for storing small files using the data tree structure includes small files less than or equal to 10 KB in size. Because of the very small size of the file, no metadata and no segments are generated; rather, the entire file's data is equivalent to one level 0 (L0) data block that can be stored in the data structure tree itself.

In one embodiment, the small file storage system retains a copy of the small file should the small file be migrated to a cloud storage. Retaining copies of small files on the storage system advantageously avoids the network latency that occurs when restoring or recalling files from cloud storage.

For small files, eliminating the need to access metadata to reconstruct the file segments, increases the efficiency of both storage and retrieval of the file in the context of deduplication. Because the files are small, the impact on the storage system capacity of retaining copies of small files that have been migrated to the cloud is small as well and is outweighed by the advantages of avoiding network latency.

Figure 1:
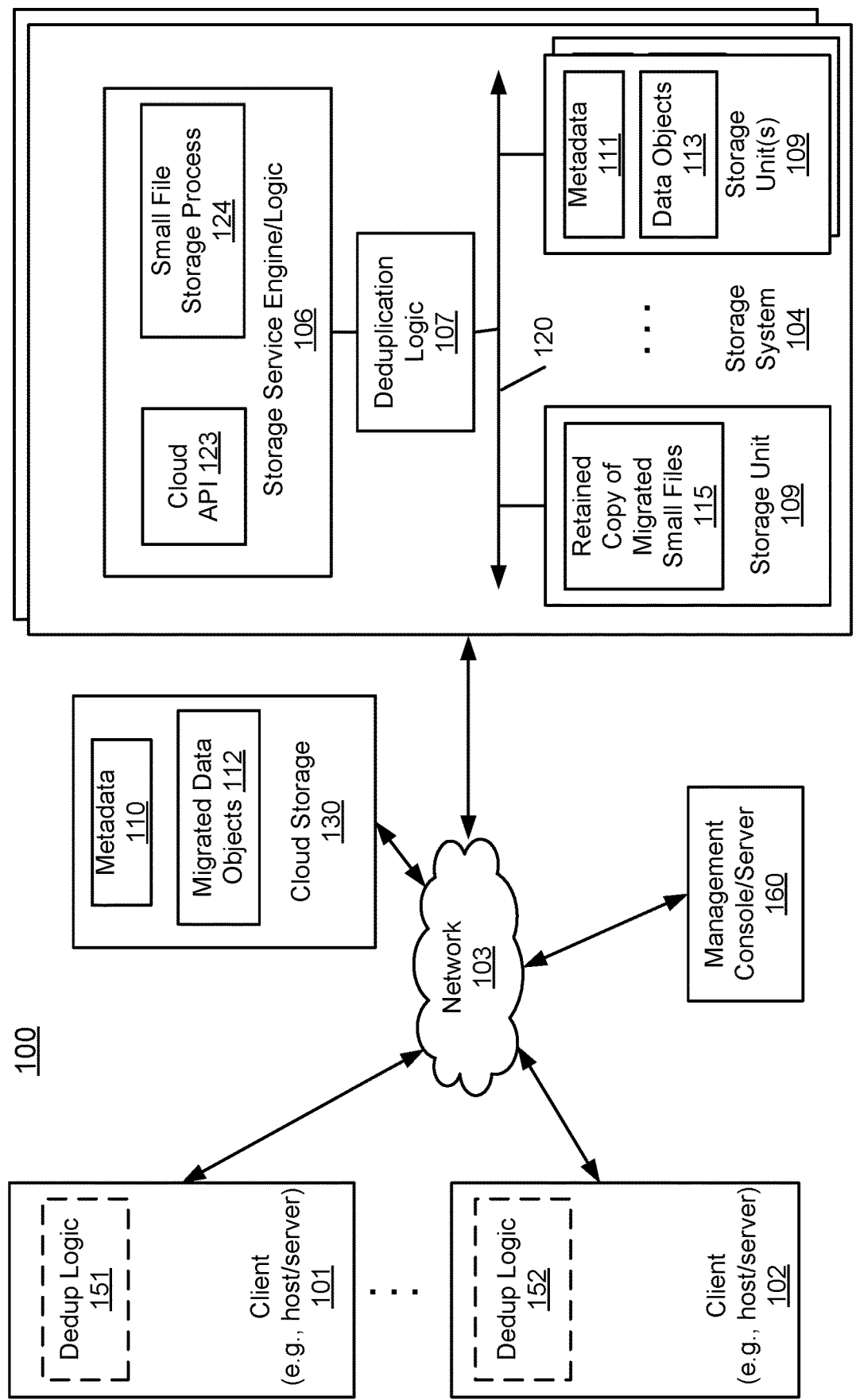
FIG. 1 is a block diagram illustrating a storage system with a small file storage process according to one embodiment of the invention.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), deduplication logic 107, and one or more storage units or devices 108-109 communicatively coupled to each other.

Storage service engine 106 may represent any storage service related components configured or adapted to provide storage services (e.g., storage as a service) to a variety of clients using any of the access protocols set forth above. For example, storage service engine 106 may include backup and restore storage services as well as cloud logic 123, for providing storage services for cloud-enabled storage 130, including a cloud application programming interface (API) to access data stored in the cloud, including storing, retrieving and reconstructing the small files using the small file storage process 124 described herein.

Storage units 109 may be implemented locally (e.g., single node operating environment) or remotely (e.g., multi-node operating environment) via interconnect 120, which may be a bus and/or a network (e.g., a storage network or a network similar to network 103). Storage units 109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 109 may be located locally or remotely accessible over a network, including being located in cloud-enabled storage 130.

In response to a data file to be stored in storage units 109, or to be synchronized to cloud storage 130, according to one embodiment, deduplication logic 107 is configured to segment the data file into data objects 112/113 in the form of multiple segments (also referred to as chunks) according to a variety of segmentation policies or rules, including the segmentation policies and rules applied to small and very small files as embodied in the small file storage process 124 as described herein.

Deduplication logic 107 may choose not to store a segment in a storage unit if the segment has been previously stored in the storage unit. In the event that deduplication logic 107 chooses not to store the segment in the storage unit, it stores metadata enabling the reconstruction of the data file using the previously stored segment. As a result, segments 112/113 of data files are stored in a deduplicated manner, either within each of storage units 109, or across at least some of the storage units or cloud storage.

The metadata, such as metadata 110-111, may be stored in at least some of storage units 109, such that files can be accessed independent of another storage unit or cloud storage 130. Metadata of each storage unit 109 and cloud storage 130 includes enough information to provide access to the files it contains. In one embodiment, instead of metadata, the data tree storage structures and data blocks generated for small and very small files includes enough information to provide access to the files it contains without having to access any metadata in accordance with one embodiment.

In response to a data file being synchronized to cloud storage 130, according to one embodiment, the storage service engine 106 and cloud logic 123 are configured to generate the data tree structures and data block maps for the small and very small data files that are stored in the context of deduplication. In a typical embodiment, the data structures for the small and very small files are generated automatically upon synchronization of a data file to the cloud storage 130, but they could also be generated for data files already synchronized to cloud storage on demand.

In one embodiment, since read performance of small files is paramount, when small and very small files are archived or migrated to cloud storage 130, the storage service engine and cloud logic 123 are configured to retain a second copy of the files 115 in the storage system rather than deleting them as is normally done. Thus, in one embodiment, rather than having to restore or recall the small and very small migrated files from cloud storage 130, which can be a slow process due to network latency, the files can simply be retrieved using the retained copy to improve read performance.

In a typical embodiment, upon receiving a request to restore a data file that is a very small or small data file, the small file storage process module 124 operates in conjunction with the storage service engine logic 106 to access the data tree structure and segment tree structures, if any, associated with the very small or small data file, initiates the processes for retrieving the small or very small file from cloud storage 130 or other long term storage, and begins reconstructing the data file. In one embodiment, for small and very small data files that have been migrated to cloud storage 130, the process for retrieving the files is performed using the retained second copy of the file 115 rather than recalling and restoring the file from the cloud.

The types of data files for which the small file storage process 124 generates the data tree structure and segment tree structures, if any, are typically such files as transaction log files, emails, metadata files and xml files, all of which are commonly encountered in enterprise and cloud computing environments. Additional details of the processes for storing and retrieving the small and very small files are described with reference to FIGS. 3-5.

In one embodiment, referring back to FIG. 1, any of clients 101-102 may further include an optional deduplication logic (e.g., deduplication logic 151-152) having at least a portion of functionalities of deduplication logic 107. Deduplication logic 151-152 are configured to perform local deduplication operations, respectively. For example, prior to transmitting data to storage system 104, each of the deduplication logic 151-152 may deduplicate the data into deduplicated segments and determine whether a particular deduplicated segment has already been stored in storage system 104. A deduplicated segment is transmitted to storage system 104 only if the deduplicated segment has not been stored in storage system 104.

For example, when client 101 is about to transmit a data stream (e.g., a file or a directory of one or more files) to storage system 104, deduplication logic 151 is configured to deduplicate the data stream into deduplicated segments. For each of the deduplicated segments, client 101 transmits a fingerprint or representative of the deduplicated segment to storage system 104 to determine whether that particular deduplicated segment has already been stored in storage system 104. A deduplicated segment that has been stored in storage system 104 may be previously received from the same client 101 or from another client such as client 102. In response to a response from storage system 104 indicating that the segment has not been stored in storage system 104, that particular segment is then transmitted over to the storage system 104. As a result, the network traffic or bandwidth and the processing resources required can be greatly reduced.

In one embodiment, storage system 104 further includes a storage manager or storage controller (not shown) configured to manage storage resources of storage system 104, such as, for example, storage space and processing resources (e.g., processor, memory, network resources). An administrator of management console or server 160 may access the storage manager or controller remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

Figure 3:
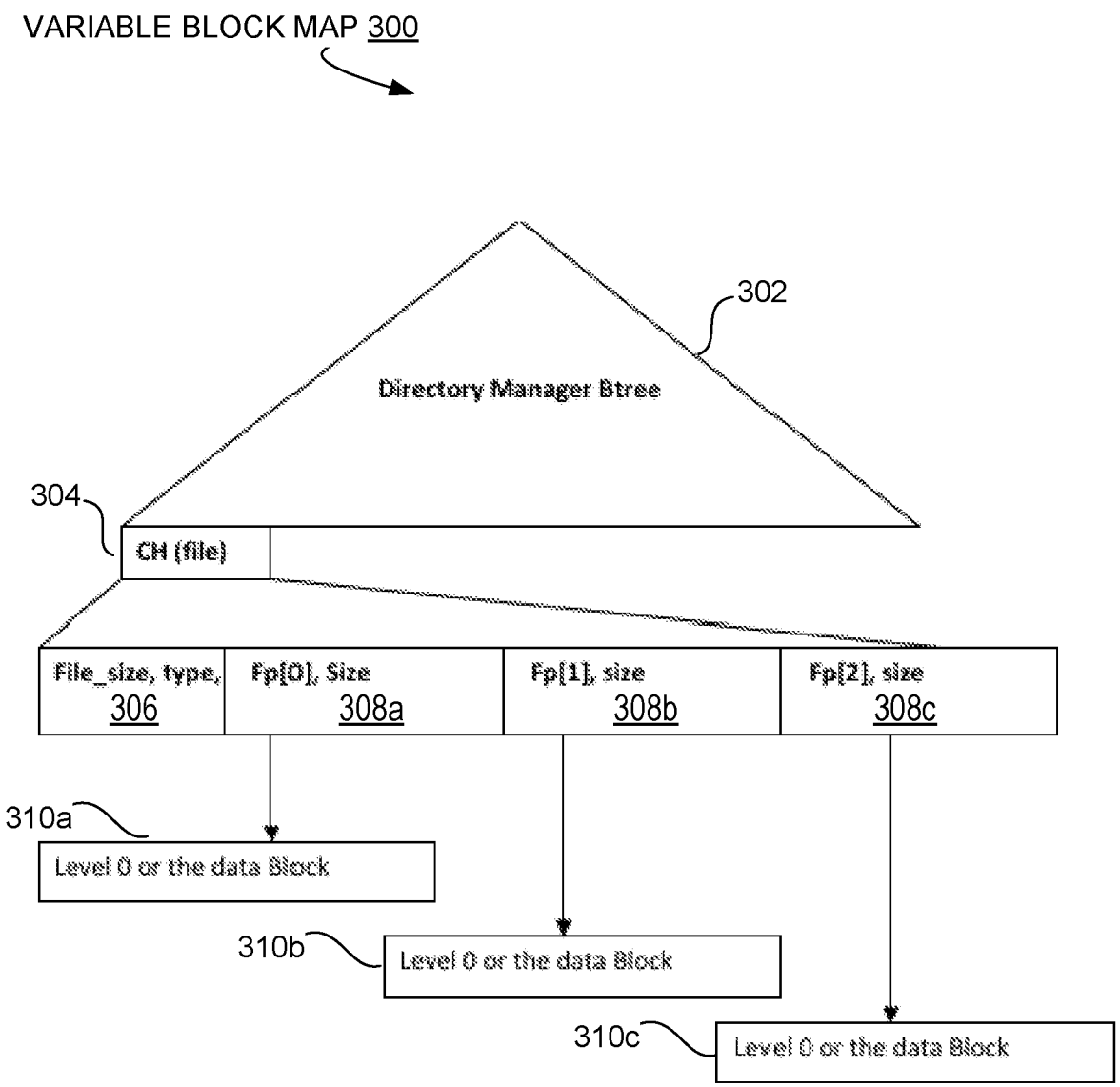
FIGS. 3-5 are block diagrams illustrating different small file storage schemes according to one embodiment of the invention.

FIG. 3 is a block diagram illustrating further details of small file storage system 124 (FIG. 1) including the variable block map 300 data structure for storing small files within a certain range of sizes. As shown, in one embodiment, the variable block map data structure 300 includes a directory manager Btree 302 and a file content handle CH 304 for the small file being stored. The CH 304 is a unique value that points to the location of the segment tree structure for storing the variable segments associated with the file, and includes a file size and type 306 followed by one or more fingerprints 308*a*/308*b*/308*c* identifying the variable segments 310*a*/310*b*/310*c*, wherein each fingerprint further specifies the size of the particular variable segment that the fingerprint identifies. Each of the variable segments 310*a*/310*b*/310*c* contains the variably sized data blocks, also referred to as level 0 (L0) blocks, that comprise the content of the small file being stored. Unlike the default tree structure 200 used to store larger files in a deduplication storage system, the variable block map 300 structure for storing small files contains no metadata segments, allowing the small files to be stored and retrieved more efficiently than larger sized files.

Figure 4:
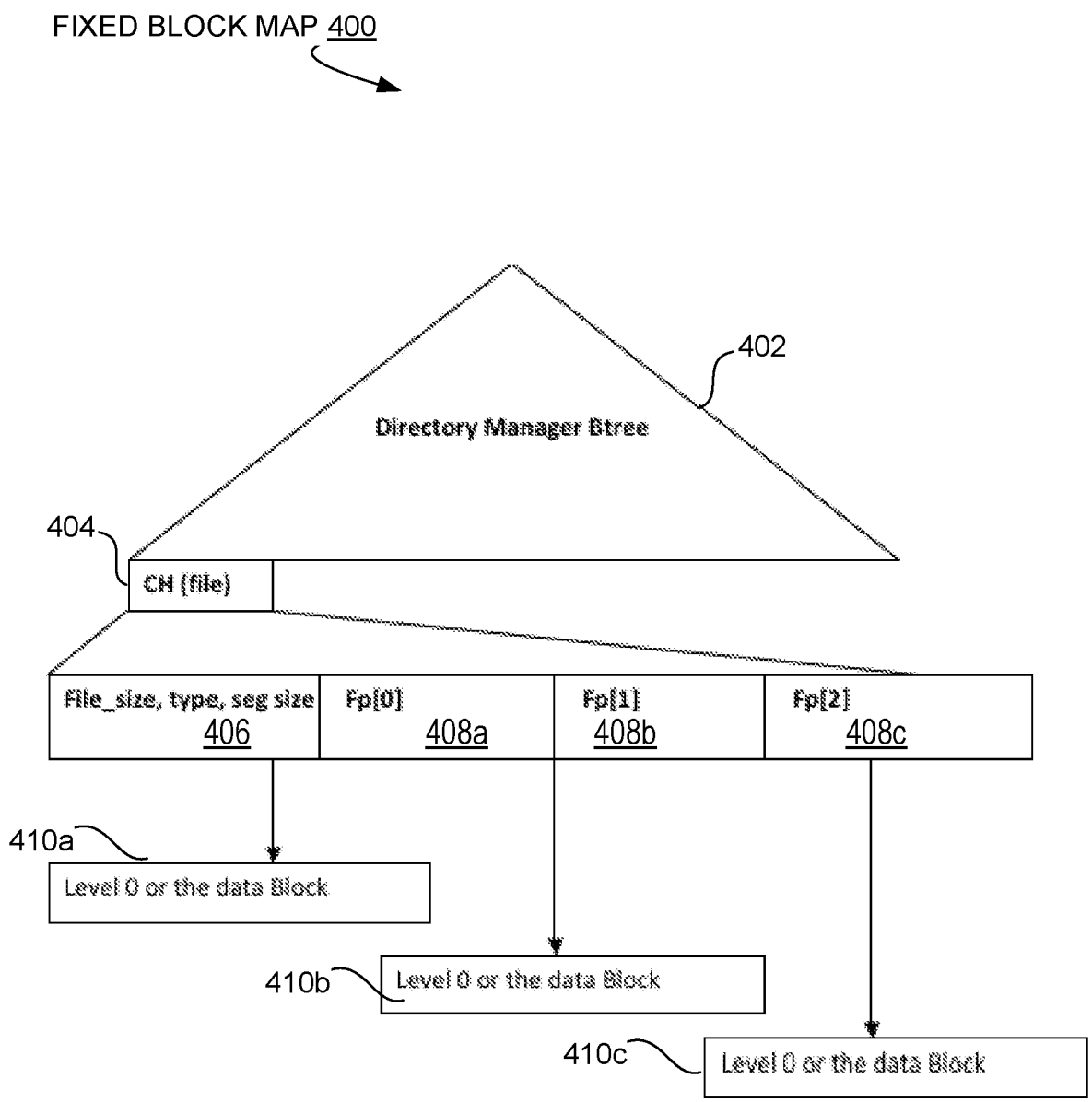

FIG. 4 is a block diagram illustrating further details of small file storage system 124 (FIG. 1) including the fixed block maps 400 data structure for storing small files within a certain range of sizes. As shown, in one embodiment, the fixed block map data structure 400 includes a directory manager Btree 402 and a file content handle CH 404 for the small file being stored. The CH 404 is a unique value that points to the location of the segment tree structure for storing the fixed segments associated with the file, and includes a file size, type and fixed segment size 406 followed by one or more fingerprints 408*a*/408*b*/408*c* identifying the fixed segments 410*a*/310*b*/310*c*. Each of the fixed segments 410*a*/310*b*/310*c* contains the fixed sized data blocks, also referred to as level 0 (L0) blocks, that comprise the content of the small file being stored. Unlike the default tree structure 200 used to store larger files in a deduplication storage system, the fixed block map 400 structure for storing small files contains no metadata segments, allowing the small files to be stored and retrieved more efficiently than larger sized files.

Figure 5:
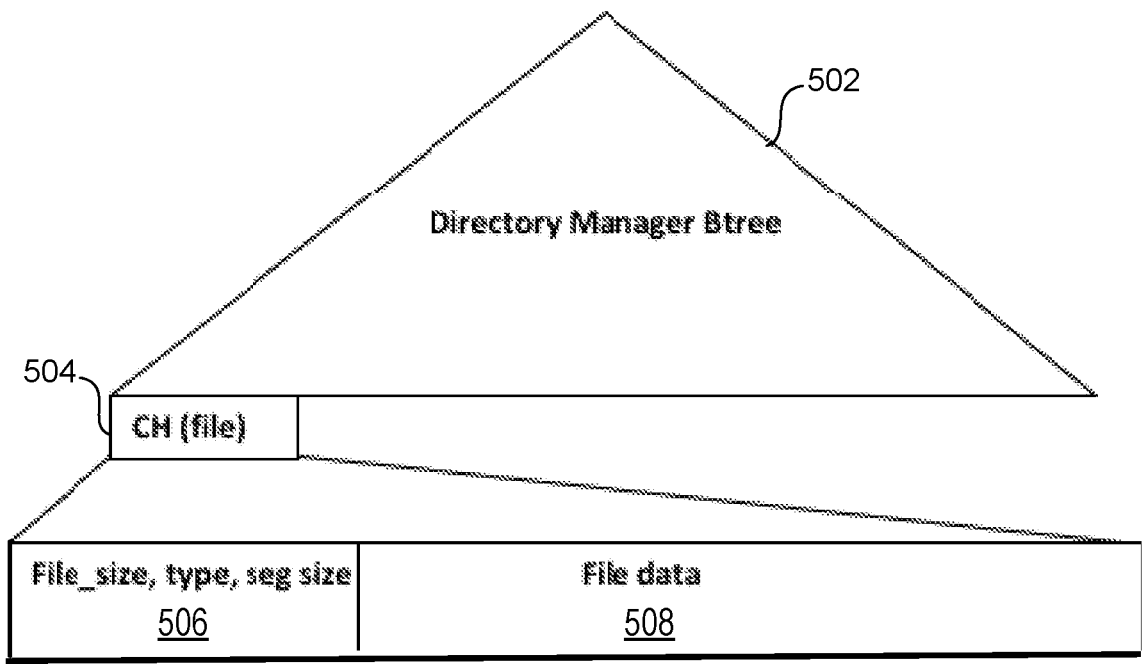

FIG. 5 is a block diagram illustrating further details of small file storage system 124 (FIG. 1) including the data tree structure 500 for storing very small files smaller than a certain threshold size, such as files smaller than 10K. As shown, in one embodiment, the data tree structure 500 includes a directory manager Btree 502 and a file content handle CH 504 for the very small file being stored. The CH 504 is a unique value that points to the location of a single data tree structure for storing the content of the very small file, and includes a file size, type and segment size 506 followed by a single block of data 508 that comprise the content of the very small file being stored. Unlike the variable and fixed data block structures in FIGS. 3 and 4, the data tree structure 500 for storing very small files does not contain fingerprints or metadata segments, allowing the very small files to be stored and retrieved more efficiently than larger sized files.

Figure 6A:
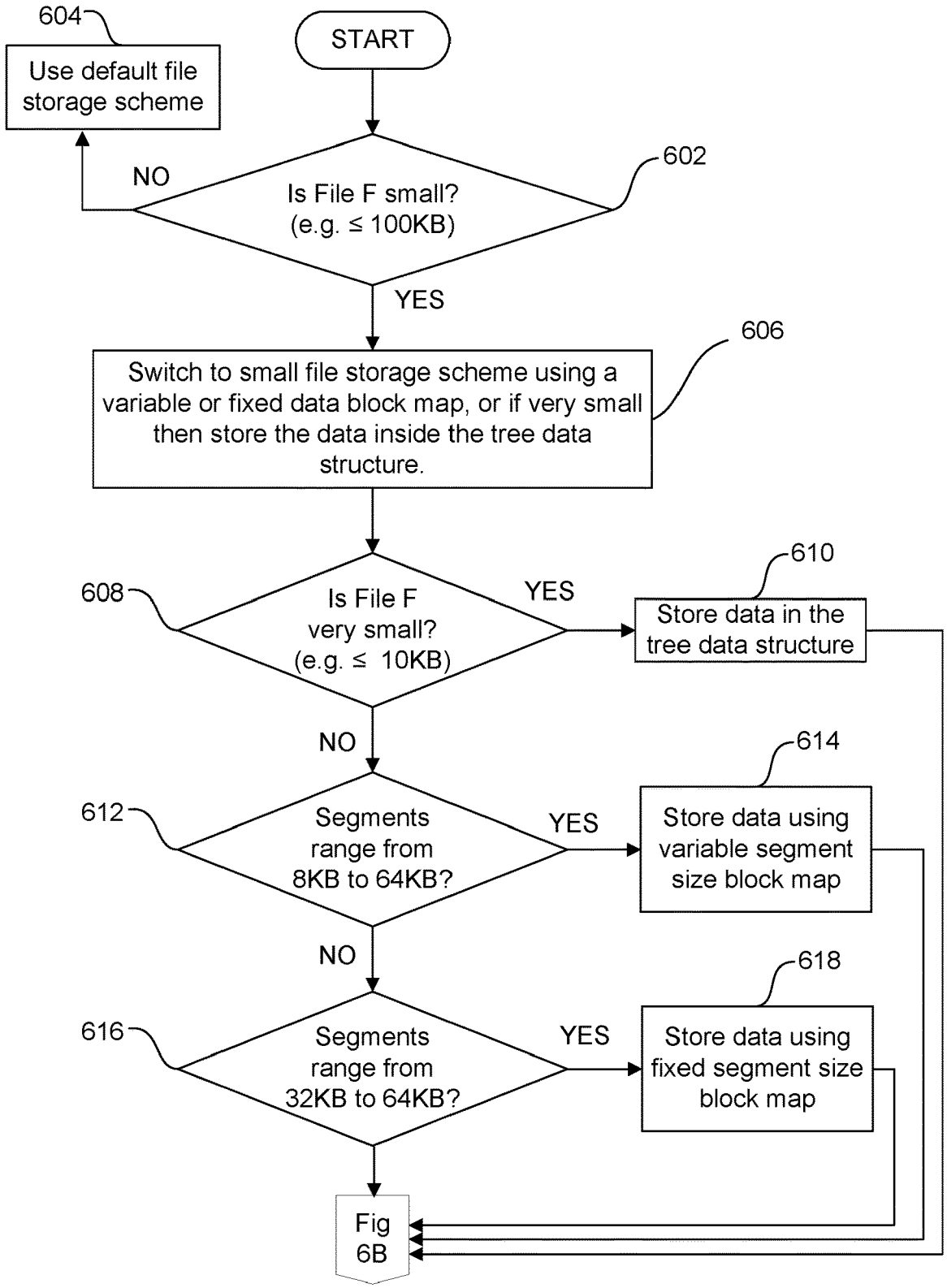
FIGS. 6A-6B are flow diagrams illustrating a small file storage process in a data storage system according to one embodiment of the invention.
Figure 6B:
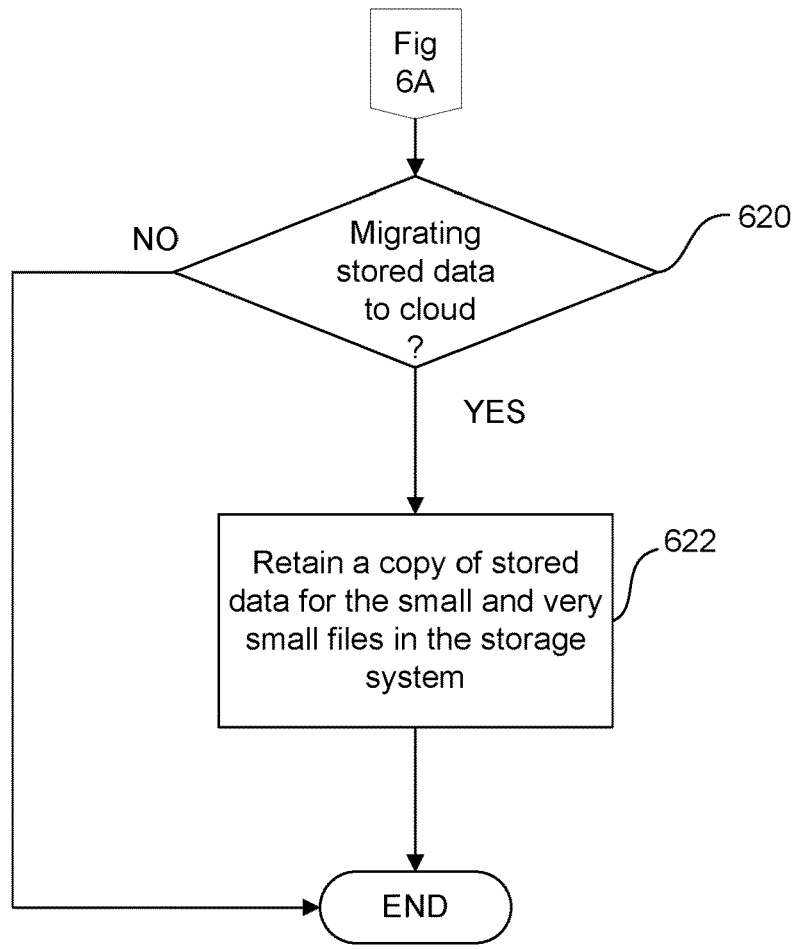

FIGS. 6A-6B are flow diagrams illustrating a summary process 600 for storing small and very small files in a data storage system using deduplication. In one embodiment, at 602, the process 600 begins by first determining whether the file being stored is a small file. For example, the process 600 determines whether the file is equal to or less than 100K in size. Any file size larger than 100K branches to the default file storage scheme 604 in the deduplication file system.

In one embodiment, at 606 the process 600 commences switching to the small file storage scheme. At decision block 608 the process 600 determines whether the file is very small, e.g. less than or equal to 10 KB in size. If so, the process 600 stores the very small file data in the data tree structure itself 610, as described with reference to FIG. 5.

In one embodiment, at decision block 612 the process 600 determines whether the file is small, e.g. whether anchoring identifies segments that range from 8 KB in size to 64 KB. If so, the process 600 stores the small file data using a variable segment size block map 614, as described with reference to FIG. 3.

In one embodiment, at decision block 616 the process 600 determines whether the file is small but within a more compact range of sizes, e.g. whether it anchoring identifies segments that range from 32 KB in size to 64 KB. If so, the process 600 stores the small file data using a fixed segment size block map 618, as described with reference to FIG. 4.

In one embodiment, at decision block 620 the process 600 determines whether any of the small and very small files that are being stored are being migrated to cloud storage. At process 622, the process 600 retains a copy of the stored data for the small and very small files in the storage system rather than deleting the migrated files as is usually done. This enables subsequent retrieval of the small and very small files to be performed efficiently from the retained copy rather than having to recall and restore the small and very small files from the cloud. Recalling and restoring files from the cloud can be quite slow due to network latency. The small amount of extra storage needed to retain a copy of small and very small files in the storage system is also small and is outweighed by the advantages of avoiding the cost of recalling and restoring such files from the cloud.

Figure 7:
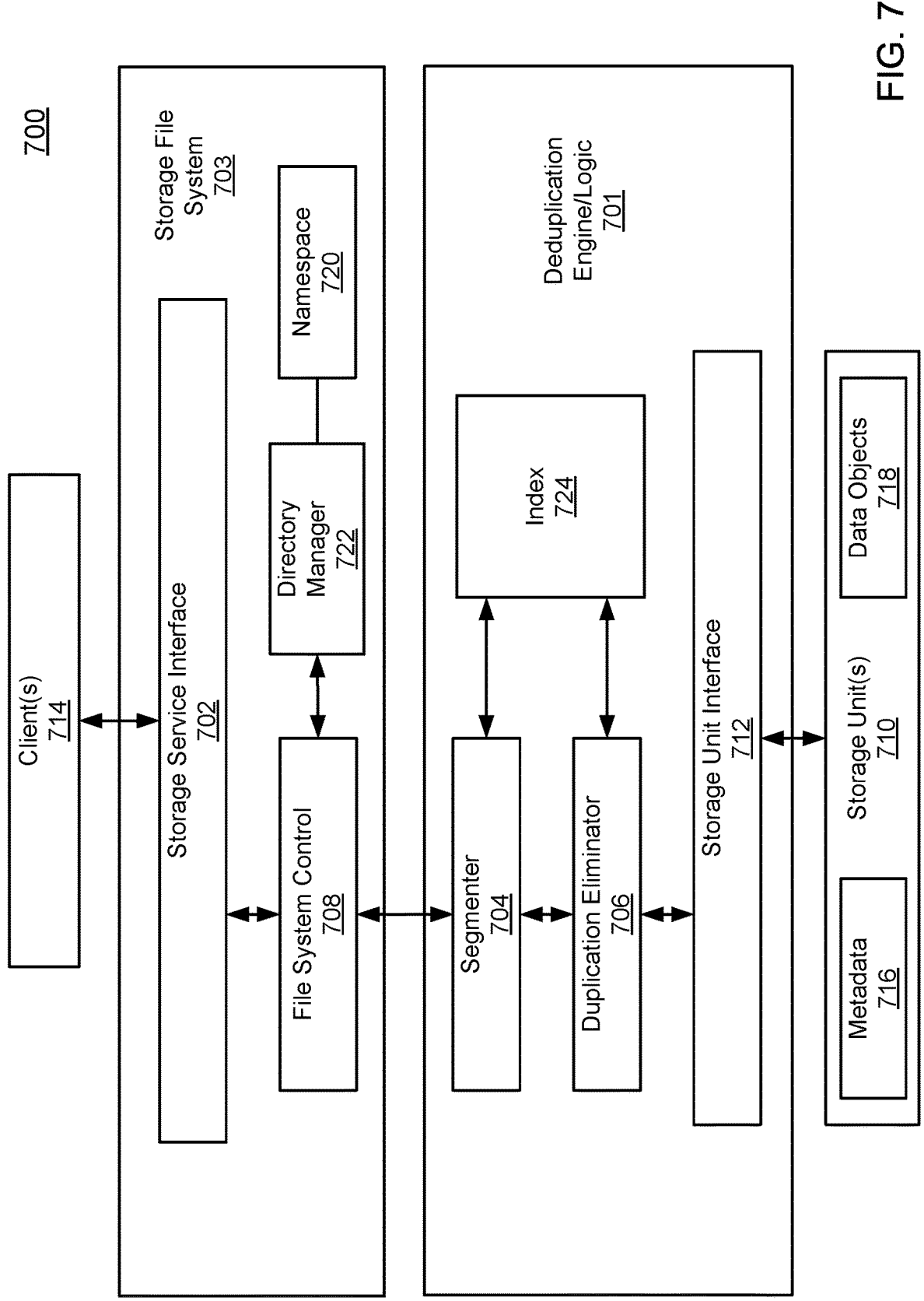
FIG. 7 is a block diagram illustrating a general overview of a system environment for providing a storage system according to one embodiment of the invention.

FIG. 7 is a block diagram illustrating a deduplication storage system according to one embodiment of the invention. For example, deduplication storage system 700 is implemented as part of the storage system 104 as described in FIG. 1, such as, for example, the deduplication logic 151/152/107 as a client and/or a server described above. In one embodiment, storage system 700 may represent a file server (e.g., an appliance used to provide network attached storage (NAS) capability), a block-based storage server (e.g., used to provide storage area network (SAN) capability), a unified storage device (e.g., one which combines NAS and SAN capabilities), a near-line storage device, a direct attached storage (DAS) device, a tape backup device, or essentially any other type of data storage device. Storage system 700 may have a distributed architecture, or all of its components may be integrated into a single unit. Storage system 700 may be implemented as part of an archive and/or backup system, or a disaster recovery system, such as a deduplicating storage system available from EMC® Corporation of Hopkinton, Mass.

In one embodiment, storage system 700 includes deduplication logic 701 interfacing one or more clients 714, via file system 703, with one or more storage units 710 storing metadata 716 and data objects 718. The deduplication logic 701 can also interface with the small file storage process 124 as described in FIG. 1 to store small files and very small files in accordance with the embodiments described with reference to FIGS. 3-6. Clients 714 may be any kinds of clients, such as, for example, a client application, backup software, a garbage collector, or a storage management function, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage devices or units 710 may be implemented locally (e.g., single node operating environment) or remotely (e.g., multi-node operating environment) via an interconnect, which may be a bus and/or a network (e.g., a storage network). In one embodiment, one of storage units 710 operates as an active storage to receive and store external or fresh user data from a client (e.g., an end-user client or a primary storage system associated with one or more end-user clients), while the another one of storage units 710 operates as a target storage unit to periodically archive data from the active storage unit according to an archiving policy or scheme.

Storage units 710 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 710 may also be combinations of such devices. In the case of disk storage media, the storage units 710 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a segment plus a difference; etc.). In one embodiment, different storage units may use different compression methods (e.g., main or active storage unit from other storage units, one storage unit from another storage unit, etc.).

The metadata, such as metadata 716, may be stored in at least some of storage units 710, such that files can be accessed independent of another storage unit. Metadata of each storage unit includes enough information to provide access to the files it contains. In one embodiment, metadata may include fingerprints or representatives contained within data objects 718, where a data object may represent a data segment (also referred to as a data chunk), a compression region (CR) of one or more data segments, or a container of one or more CRs. Fingerprints are mapped to a particular data object via metadata 716, enabling the system to identify the location of the data object containing a data segment represented by a particular fingerprint. A fingerprint may be generated based on at least a portion of a data segment, for example, by applying a predetermined mathematical algorithm (e.g., hash function) to at least a portion of the content of the data segment. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, metadata 716 may include a file name, a storage unit identifier (ID) identifying a storage unit in which the segments associated with the file name are stored, reconstruction information for the file using the segments, and any other appropriate metadata information. Metadata 716 may further include a segment ID, a segment sketch, a hash of a segment, an encrypted hash of a segment, random data, or any other appropriate metadata. In some embodiments, metadata associated with a segment is used to identify identical and/or similar data segments. The stored metadata enables a faster identification of identical and/or similar data segments as an ID and/or sketch (e.g., a set of values characterizing the segment) do not need to be recomputed for the evaluation of a given incoming data segment.

In one embodiment, a segment ID includes one or more deterministic functions of a data segment (also referred to as a data segment), one or more hash functions of a data segment, random data, or any other appropriate data segment ID. In various embodiments, a data segment sketch includes one or more deterministic functions of a data segment, one or more hash functions of a data segment, one or more functions that return the same or similar value for the same or similar data segments (e.g., a function that probably or likely returns a same value for a similar data segment), or any other appropriate data segment sketch. In various embodiments, sketch function values are determined to be similar using one or more of the following methods: numeric difference, hamming difference, locality-sensitive hashing, nearest-neighbor-search, other statistical methods, or any other appropriate methods of determining similarity. In one embodiment, sketch data includes one or more data patterns characterizing a segment. For example, a sketch may be generated by applying one or more functions (e.g., hash functions) on a segment and a subset of the results of the functions performed on the segment (e.g., a number of results, for example the ten lowest results or the ten highest results) are selected as a sketch.

In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units, identifying specific data objects).

In one embodiment, file system 703 includes file service interface 702, file system control logic 708, directory manager 722, and namespace 720. Deduplication logic 701 includes segmenter 704 (also referred to as a segmenting module or unit), duplication eliminator 706, and storage unit interface 712. File system control 708 receives a file or files (or data item(s)) via file service interface 702, which may be part of a file system namespace 720 of file system 703 associated with the deduplication logic 701. The file system namespace 720 refers to the way files are identified and organized in the system, and includes the small file and very small file data structures described with reference to FIGS. 3-5 in accordance with one embodiment of the invention.

An example of the file system namespace 720 is to organize the files hierarchically into directories or folders, which may be managed by directory manager 722. File service interface 712 supports a variety of protocols, including a network file system (NFS), a common Internet file system (CIFS), a direct access file system (DAFS), Hadoop distributed file system (HDFS), and a virtual tape library interface (VTL), etc.

The file(s) is/are processed by segmenter 704 and file system control 708. In accordance with one embodiment, the small file storage process 124 described with reference to FIG. 1 identifies and processes small files and very small files. For those files that are large enough to require segmentation, segmenter 704, also referred to as a content store, breaks the file(s) into variable-length segments based on a variety of rules or considerations. For example, the file(s) may be broken into segments by identifying segment boundaries. Segment boundaries may be determined using file boundaries, directory boundaries, byte counts, content-based boundaries (e.g., when a hash of data in a window is equal to a value), or any other appropriate method of determining a boundary. Reconstruction of a data block, data stream, file, or directory includes using one or more references to the one or more segments that originally made up a data block, data stream, file, or directory that was/were previously stored.

In some embodiments, segments are segmented by identifying segment boundaries that are content-based, such as, for example, a hash function is applied to values of data within a sliding window through the data stream or block and when the hash function is equal to a value (or equal to one of several values) then a segment boundary is identified. In various embodiments, segment boundaries are identified using content based functions operating on a sliding window within a data stream or block that have a minimum or maximum or other value or any other appropriate content based segmenting algorithm. In various embodiments, segments include fixed-length segments, variable length segments, overlapping segments, non-overlapping segments, segments with a minimum size, segments with a maximum size, or any other appropriate segments. In various embodiments, segments include files, groups of files, directories, a portion of a file, a portion of a data stream with one or more boundaries unrelated to file and/or directory boundaries, or any other appropriate segment. For small and very small files, the segments include fixed and variable length segments, or even no segments at all for those files small enough to be contained within a single data tree structure as described with reference to FIGS. 5 and 6.

In one embodiment, a segment boundary is determined using a value of a function calculated for multiple windows within a segmentation window. Values are computed that are associated with candidate boundaries within the segmentation window. One of the candidate boundaries is selected based at least in part on a comparison between two or more of the computed values. In one embodiment, a segmentation window can be determined by determining a first location corresponding to a minimum segment length and determining a second location corresponding to a maximum length, where data within the segmentation window is considered the segment from the first location to the second location.

Determining a boundary can include determining multiple windows within the segmentation window. Each window corresponds to a location within the segmentation window and is associated with a candidate boundary. In one embodiment, a function is then evaluated for each window. The function has as its inputs one or more data values of the window. In one embodiment, the function includes a hash function, such as, for example, SHA-1 (Secure Hash Algorithm 1), SHA-256, SHA-384, SHA-512, MD5 (Message-Digest algorithm 5), RIPEMD-160 (RACE Integrity Primitives Evaluation Message Digest 160-bit version), a Rabin hash, a fingerprint, a CRC (Cyclic Redundancy Check), a sum, an XOR, or any other appropriate function to distinguish a window. After the function values are generated for all windows, a boundary is selected based at least in part on the values that were generated, for example, the location corresponding to an extrema of a function value of all values generated, the location corresponding to the minimum value of all values generated is selected, the location corresponding to the maximum value of all values generated is selected, the location corresponding to a value with the longest run of 1 bits in its value of all values generated is selected, or the location corresponding to a value with the most 1 bits in its value of all values generated is selected. If there is tie for the value, criteria of selecting the location that maximizes or minimizes the segment length could be adopted.

In one embodiment, file system control 708, also referred to as a file system manager, processes information to indicate the segment(s) association with a file. In some embodiments, a list of fingerprints is used to indicate segment(s) associated with a file. File system control 708 passes segment association information (e.g., representative data such as a fingerprint) to index 724. Index 724 is used to locate stored segments in storage units 710 via storage unit interface 712. In one embodiment, index 724 may include multiple entries, each entry corresponding one of the deduplicated segments. Each entry maps a representative or fingerprint of a deduplicated segment to a storage location identifier identifying a storage location storing the corresponding deduplicated segment. In one embodiment, each entry of index 724 maps a fingerprint of a segment to a container identifier identifying a container that contains the corresponding segment.

In one embodiment, index 724 includes a persistent hash-table of segment-IDs keyed either by the digest of the data stored in the segment or by the deduplication key of the data stored in the segment. The index 724 need not contain entries for every data segment in the deduplication domain, but the effectiveness of deduplication is a function of the number of entries stored in the index 724. Deduplication of data happens in two logically distinct operations: detection and remapping. The detection operation identifies blocks containing the same data. The remapping operation updates address maps that record physical locations of logical units of data so that a single block of data is shared by multiple logical units (LUNs) or by multiple positions within the same LUN. Detection is accomplished by building a database (e.g., index 724) that maintains a digest (e.g., SHA, checksum) and a deduplication key for each data block. When two data blocks have the same digest they have a sufficiently high probability of containing the same data to warrant a bit-for-bit comparison to confirm they are exact duplicates. Remapping leverages dynamic block-mapping technology of a file system mapping driver. A file system allows dynamic manipulation of the address maps that connects LUN's logical address space to its physical address space.

Duplication eliminator 706, also referred to as a segment store, identifies whether a newly received segment has already been stored in storage units 710. In the event that a segment has already been stored in storage unit(s), a reference to the previously stored segment is stored, for example, in a segment tree associated with the file, instead of storing the newly received segment. A segment tree of a file may include one or more nodes and each node represents or references one of the deduplicated segments stored in storage units 710 that make up the file. Segments are then packed by a container manager (which may be implemented as part of storage unit interface 712) into one or more storage containers stored in storage units 710. The deduplicated segments may be further compressed into one or more CRs using a variation of compression algorithms, such as a Lempel-Ziv algorithm before being stored. A container may contain one or more CRs and each CR may contain one or more deduplicated segments (also referred to deduplicated segments). A container may further contain the metadata such as fingerprints, sketches, type of the data segments, etc. that are associated with the data segments stored therein.

When a file is to be retrieved, file service interface 702 is configured to communicate with file system control 708 to identify appropriate segments stored in storage units 710 via storage unit interface 712. Storage unit interface 712 may be implemented as part of a container manager. File system control 708 communicates (e.g., via segmenter 704) with index 724 to locate appropriate segments stored in storage units via storage unit interface 712. Appropriate segments are retrieved from the associated containers via the container manager and are used to construct the requested file. The file is provided via interface 702 in response to the request. In one embodiment, file system control 708 utilizes a tree (e.g., a segment tree obtained from namespace 720) of content-based identifiers (e.g., fingerprints) to associate a file with data segments and their locations in storage unit(s). In one embodiment, when reconstructing small and very small files, the file system control 708 utilizes the data block mapping and/or data tree structures as described with reference to FIGS. 3-5. In the event that a segment associated with a given file or file changes, the content-based identifiers will change and the changes will ripple from the bottom to the top of the tree associated with the file efficiently since the appropriate content-based identifiers are easily identified using the tree structure.

In one embodiment, storage system 700 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Note that some or all of the components as shown and described above (e.g., deduplication logic 701) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into a dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
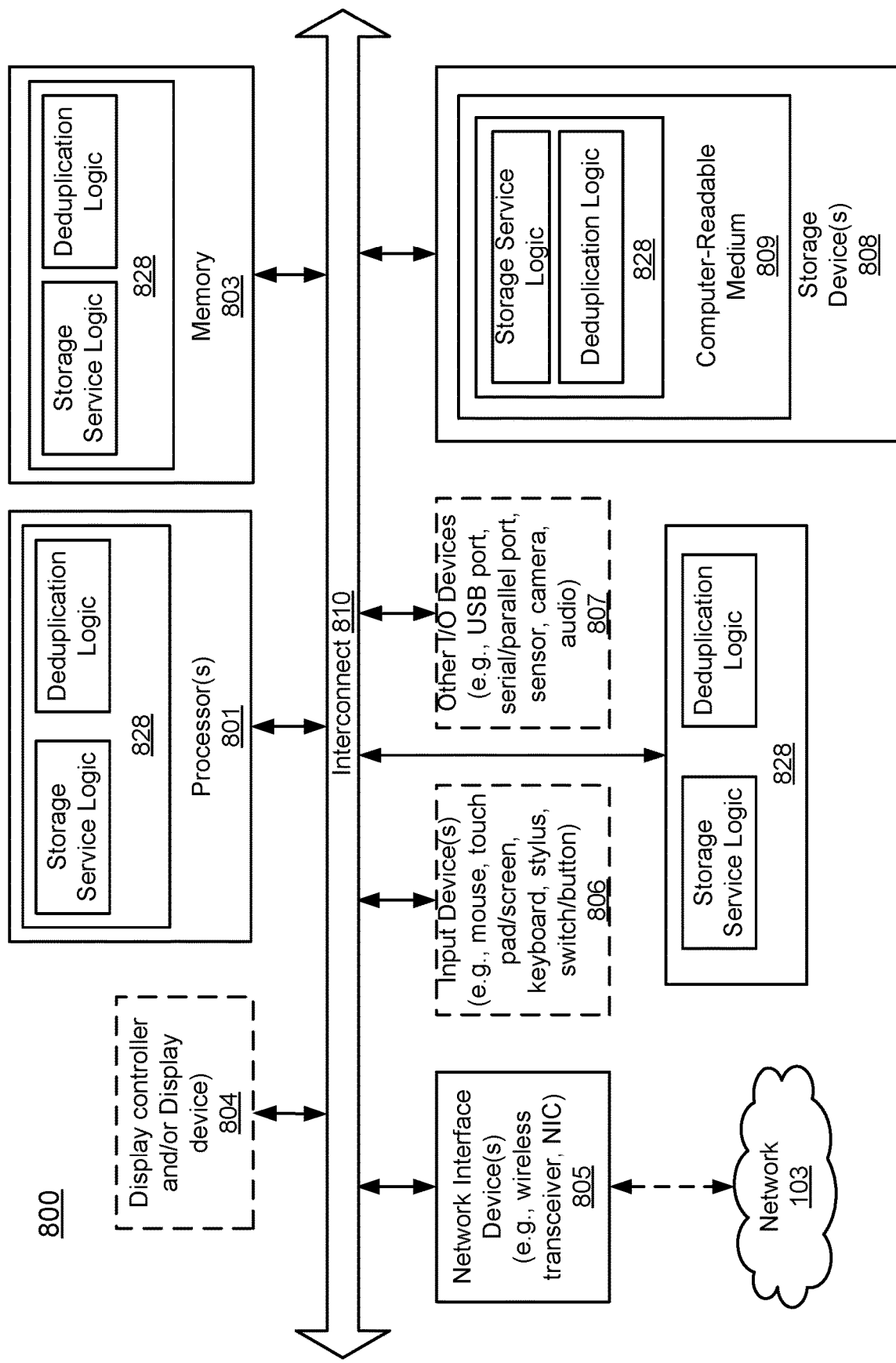
FIG. 8 is a block diagram illustrating a general overview of a data processing system environment for providing a storage system according to one embodiment of the invention.

FIG. 8 is a block diagram illustrating an example of a data processing system that may be used with one embodiment of the invention. For example, system 800 may represents any of data processing systems described above performing any of the processes or methods described above. System 800 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 800 is intended to show a high level view of many components of the computer system. However, it is to be understood that additional components may be present in certain implementations and furthermore, different arrangement of the components shown may occur in other implementations. System 800 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 800 includes processor 801, memory 803, and devices 805-808 via a bus or an interconnect 810. Processor 801 may represent a single processor or multiple processors with a single processor core or multiple processor cores included therein. Processor 801 may represent one or more general-purpose processors such as a microprocessor, a central processing unit (CPU), or the like. More particularly, processor 801 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 801 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 801, which may be a low power multi-core processor socket such as an ultra-low voltage processor, may act as a main processing unit and central hub for communication with the various components of the system. Such processor can be implemented as a system on chip (SoC). Processor 801 is configured to execute instructions for performing the operations and steps discussed herein. System 800 may further include a graphics interface that communicates with optional graphics subsystem 804, which may include a display controller, a graphics processor, and/or a display device.

Processor 801 may communicate with memory 803, which in one embodiment can be implemented via multiple memory devices to provide for a given amount of system memory. Memory 803 may include one or more volatile storage (or memory) devices such as random access memory (RAM), dynamic RAM (DRAM), synchronous DRAM (SDRAM), static RAM (SRAM), or other types of storage devices. Memory 803 may store information including sequences of instructions that are executed by processor 801, or any other device. For example, executable code and/or data of a variety of operating systems, device drivers, firmware (e.g., input output basic system or BIOS), and/or applications can be loaded in memory 803 and executed by processor 801. An operating system can be any kind of operating systems, such as, for example, Windows® operating system from Microsoft®, Mac OS/iOS from Apple, Android® from Google®, Linux®, Unix®, or other real-time or embedded operating systems such as VxWorks.

System 800 may further include IO devices such as devices 805-808, including network interface device(s) 805, optional input device(s) 806, and other optional IO device(s) 807. Network interface device 805 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 806 may include a mouse, a touch pad, a touch sensitive screen (which may be integrated with display device 804), a pointer device such as a stylus, and/or a keyboard (e.g., physical keyboard or a virtual keyboard displayed as part of a touch sensitive screen). For example, input device 806 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 807 may include an audio device. An audio device may include a speaker and/or a microphone to facilitate voice-enabled functions, such as voice recognition, voice replication, digital recording, and/or telephony functions. Other IO devices 807 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 807 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 810 via a sensor hub (not shown), while other devices such as a keyboard or thermal sensor may be controlled by an embedded controller (not shown), dependent upon the specific configuration or design of system 800.

To provide for persistent storage of information such as data, applications, one or more operating systems and so forth, a mass storage (not shown) may also couple to processor 801. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 801, e.g., via a serial peripheral interface (SPI). This flash device may provide for non-volatile storage of system software, including a basic input/output software (BIOS) as well as other firmware of the system.

Storage device 808 may include computer-accessible storage medium 809 (also known as a machine-readable storage medium or a computer-readable medium) on which is stored one or more sets of instructions or software (e.g., module, unit, and/or logic 828) embodying any one or more of the methodologies or functions described herein. Module/unit/logic 828 may also reside, completely or at least partially, within memory 803 and/or within processor 801 during execution thereof by data processing system 800, memory 803 and processor 801 also constituting machine-accessible storage media. Module/unit/logic 828 may further be transmitted or received over a network via network interface device 805.

Computer-readable storage medium 809 may also be used to store the some software functionalities described above persistently. While computer-readable storage medium 809 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 828, components and other features described herein can be implemented as discrete hardware components or integrated in the functionality of hardware components such as ASICS, FPGAs, DSPs or similar devices. In addition, module/unit/logic 828 can be implemented as firmware or functional circuitry within hardware devices. Further, module/unit/logic 828 can be implemented in any combination hardware devices and software components.

Note that while system 800 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for managing small and very small files in an object storage, the method comprising:
    determining whether a file is small in a file system having a data tree structure representing small files, the data tree structure including a data block map of any one or more segments comprising the small files, the data block map including any one of a variable block map, a fixed block map and a single block map;
    determining whether the small file should be stored using any one of the variable block map, the fixed block map and the single block map without generating metadata associated with the small file;
    generating the data block map for the small file, wherein generating the data block map for the small file includes:
        generating the fixed block map for the small file in which the size of segments identified for the file range from 8 KB to 64 KB, including generating the fixed segment size for the data tree structure, generating fingerprints for each of the fixed segments comprising the small file,
        generating the variable block map for small files in which the size of segments identified for the file range from 32 KB to 64 KB, including generating the variable segment size and fingerprints for each of the variable segments comprising the file, and
        generating the single block map for small files where a size of the file is determined to be less than a threshold size for very small files of less than 10 KB, including generating the single data tree structure containing all of the data comprising the very small file; and
    storing the small file in the object storage based on the generated data block map without generating the metadata.

2. The computer-implemented method of claim 1, wherein the size of the file is small relative to sizes of other files in the file system when the size of the file is less than or equal to 100 KB.

3. The computer-implemented method of claim 1, wherein the metadata includes a file name, a storage unit identifier, and reconstruction information for the small file using the segments.

4. The computer-implemented method of claim 1, wherein the single block map includes small files in which the size of segments identified for the file is less than or equal to 10 KB.

5. The computer-implemented method of claim 1, wherein the fixed data block map and the variable data block map do not contain segments of the metadata, and wherein the single data tree structure does not contain segments of the metadata and fingerprints identifying the segments of the small file.

6. A data processing system comprising:
    a deduplication file system having a data tree structure representing small files, the data tree structure including a data block map of any one or more segments comprising the small files, the data block map including any one of a variable block map, a fixed block map and a single block map; and
    a processor configured to store a file using the data block map including:
        determining whether the file is small,
        determining whether the small file should be stored using any one of the variable block map, the fixed block map and the single block map without generating metadata associated with the small file,
        generating the data block map for the small file, wherein generating the data block map for the small file includes:
            generating the fixed block map for small files in which a size of segments identified for the file range from 8 KB to 64 KB, including generating the fixed segment size for the data tree structure, generating fingerprints for each of the fixed segments comprising the small file,
            generating the variable block map for small files in which the size of segments identified for the file range from 32 KB to 64 KB, including generating the variable segment size and fingerprints for each of the variable segments comprising the file, and generating the single block map for small files where a size of the file is determined to be less than a threshold size for very small files of less than 10 KB, including generating the single data tree structure containing all of the data comprising the very small file, and storing the small file in an object storage based on the generated data block map without generating the metadata.

7. The data processing system of claim 6, further comprising:

the processor configured to retrieve the file using the data block map including:

determining whether the file is a small file;

determining whether the small file was stored using any one of the variable block map, the fixed block map, and the single block map; and retrieving the file in accordance with the any one of the variable block map, the fixed block map, and the single block map with which the small file was stored.

8. The data processing system of claim 6, wherein the metadata includes a file name, a storage unit identifier, and reconstruction information for the small file using the segments.

9. A non-transitory computer-readable storage medium having instructions stored therein, which when executed by a processor, cause the processor to perform operations for managing small files in an object storage, the operations comprising:

determining whether a file is small in a file system having a data tree structure representing small files, the data tree structure including a data block map of any one or more segments comprising the small files, the data block map including any one of a variable block map, a fixed block map and a single block map;

determining whether the small file should be stored using any one of the variable block map, the fixed block map and the single block map without generating metadata associated with the small file;

generating the data block map for the small file, wherein generating the data block map for the small file includes:

generating the fixed block map for the small file in which the size of segments identified for the file range from 8 KB to 64 KB, including generating the fixed segment size for the data tree structure, generating fingerprints for each of the fixed segments comprising the small file, generating the variable block map for small files in which the size of segments identified for the file range from 32 KB to 64 KB, including generating the variable segment size and fingerprints for each of the variable segments comprising the file, and generating the single block map for small files where a size of the file is determined to be less than a threshold size for very small files of less than 10 KB, including generating the single data tree structure containing all of the data comprising the very small file; and storing the small file in the object storage based on the generated data block map without generating the metadata.

10. The non-transitory computer-readable storage medium of claim 9, wherein the size of the file is small relative to sizes of other files in the file system when the size is less than or equal to 100 KB.

11. The non-transitory computer-readable storage medium of claim 9, wherein the metadata includes a file name, a storage unit identifier, and reconstruction information for the small file using the segments.

12. The non-transitory computer-readable storage medium of claim 9, wherein the single block map includes small files in which the size of segments identified for the file is less than or equal to 10 KB.

13. The non-transitory computer-readable storage medium of claim 9, wherein the fixed data block map and the variable data block map do not contain segments of the metadata, and wherein the single data tree structure does not contain segments of the metadata and fingerprints identifying the segments of the small file.

* * * * *